United States Patent
Basak et al.

(10) Patent No.: US 9,535,981 B2
(45) Date of Patent: Jan. 3, 2017

(54) SYSTEMS AND METHODS FOR FILTERING LOW UTILITY VALUE MESSAGES FROM SYSTEM LOGS

(71) Applicant: NetApp, Inc., Sunnyvale, CA (US)

(72) Inventors: Jayanta Basak, Kodihalli (IN); Nagesh Panyam Chandrasekarasastry, Karnataka (IN)

(73) Assignee: NETAPP, INC., Sunnyvale, CA (US)

( * ) Notice: Subject to any disclaimer, the term of this patent is extended or adjusted under 35 U.S.C. 154(b) by 177 days.

(21) Appl. No.: 13/942,392

(22) Filed: Jul. 15, 2013

(65) Prior Publication Data

US 2015/0019512 A1    Jan. 15, 2015

(51) Int. Cl.
*G06F 17/30* (2006.01)
*G06F 11/07* (2006.01)

(52) U.S. Cl.
CPC ..... *G06F 17/30699* (2013.01); *G06F 11/0706* (2013.01); *G06F 11/0781* (2013.01); *G06F 17/30156* (2013.01)

(58) Field of Classification Search
CPC ................................................. G06F 17/30156
See application file for complete search history.

(56) References Cited

U.S. PATENT DOCUMENTS

| | | | |
|---|---|---|---|
| 7,389,345 B1 | 6/2008 | Adams | |
| 7,475,401 B1 | 1/2009 | Frey et al. | |
| 8,407,335 B1* | 3/2013 | Church | G06F 11/0709 709/218 |
| 2004/0225689 A1 | 11/2004 | Dettinger et al. | |
| 2005/0251625 A1* | 11/2005 | Nagae et al. | 711/129 |
| 2006/0294214 A1* | 12/2006 | Chou | H04L 41/0681 709/223 |
| 2007/0283194 A1* | 12/2007 | Villella et al. | 714/57 |
| 2008/0104229 A1* | 5/2008 | Cowham | G06Q 10/06 709/224 |
| 2011/0270957 A1 | 11/2011 | Phan et al. | |
| 2013/0227352 A1* | 8/2013 | Kumarasamy et al. | 714/47.1 |

OTHER PUBLICATIONS

International Search Report for Application No. PCT/US2014/043471 mailed on Oct. 8, 2014, 3 pages.

* cited by examiner

*Primary Examiner* — Etienne Leroux
*Assistant Examiner* — Cindy Nguyen
(74) *Attorney, Agent, or Firm* — Klein, O'Neill & Singh, LLP

(57) ABSTRACT

Systems and methods disclosed herein provide intelligent filtering of system log messages having low utility value. In providing the filtering, the systems and methods determine the utility value of a system log message and delete the message from the system log if the message is determined to be of low utility value. As such, embodiments herein provide an system log filter, which reduces the amount of data stored in the system log based on the utility value of the message.

19 Claims, 4 Drawing Sheets

SYSTEMS AND METHODS FOR FILTERING LOW UTILITY VALUE MESSAGES FROM SYSTEM LOGS

TECHNICAL FIELD

Embodiments herein are related to filtering system logs and more particularly to filtering low utility value messages from system logs.

BACKGROUND OF THE INVENTION

System logs contain messages emitted from several modules within a computing system and comprise valuable information about the status of various tasks, execution paths, error conditions, system states, device changes, device drivers, system changes, events, system operations, and more. Often, system logs comprise messages, for example, unstructured text messages, logged by several modules of a system. Users of system logs may include administrators, customer support engineers, and developers. In practice, log users analyze information provided by the logged messages and use that information for proactive repair, alerting, problem forecasting, and diagnosis of the system. For example, messages of the system log such as "disk failure" or "network interconnect failure" messages may cause an administrator to perform urgent system intervention. Further, messages such as "SCSI adapter encountered an unexpected bus phase" may help developers determine a bug location and remedy the bug.

Log users may be local or remote to the system. For example, storage enterprises, for example NetApp®, offer live and remote customer support by periodically collecting system logs from live deployments at customer locations. For customers with remote support, the customer system collects system logs from buffers in the client system and transmits the logs to a central enterprise repository, where the logs are monitored for alerts, problem forecasting, and troubleshooting. As systems grow in complexity, system logs grow in size. A study disclosed in Xu, Wei, Ling Huang, Armando Fox, David Patterson, and Micheal Jordon, *Experience Mining Google's Production Console Logs. In Proc. Of SLAML* (2010), showed that the number of log messages in a product increased by hundreds per month at all stages of product development. The ever increase in system log size are causing an increase in the costs of system log collection, monitoring, transmission, and archival.

Large system logs impact several resources. For example, large system logs overload log users with too much information. Often, log users manually inspect system logs when performing troubleshooting and other log related activities. For an enterprise with thousands of deployments, the cost of human resources to manually inspect system logs may be burdensome. Thus, a reduction in the number of messages a log user reads in order to render their services would be desirable.

In another example, system logs are stored on buffers of finite memory space. As a result, systems have had to place strict upper limits on the size of their system logs in order to prevent buffer overflow, which leads to unintentional message dropping. Buffer memory is costly and ultimately limited in size. As such, it would be desirable to reduce the size of the system logs to accommodate the buffers' finite size and prevent buffer overflow.

Another example of the impact that large system logs have on resources involves bandwidth. As explained above, for customers with remote support, the customer system collects system logs and transmits the logs to a central repository. The transmission of system logs from customer sites to enterprise repositories consume substantial network bandwidth effecting the customers, the remote support enterprise, the network provider, and unaffiliated third parties who happen to share the network bandwidth. Further, receiving large system logs directly increases the storage costs for the remote enterprise providing the support. Therefore, a reduction in the amount of data transmitted from the customer's system to the enterprise's system would be advantageous.

The desire to reduce resource drain caused by large log sizes has been recognized in the industry; however, industry has thus far primarily focused on reducing the expense caused by information overload on log users who manually inspect system logs. Cisco router logs, as described in Tim Kramer, *Effective Log Reduction and Analysis Using Linux and Open Source Tools*, have developed a solution that reduces the amount of information that a log user views at any one time. With the use of Cisco router logs, several tools and utilities are provided for fast parsing and searching through log files. The tools are effective for sorting through large amounts of log messages and presenting the log user with a subset of the system log's messages, which is easier to view and more manageable to work with. A similar approach to dealing with log sizes involves the aid of visualization, as described in Tetsuji Takada and Hideki Koike. *Meilog: A highly interactive visual log browser using information visualization and statistical analysis. In In Proc. USENIS Cof on System Administration,* 2002, which helps reduce the recognition load and to pin point unusual log messages in an interactive and visual log browser.

While the proposed solutions may present the system log messages in a manner that is easier for a human user to digest, the proposed solutions do not delete messages or reduce the overall size of the system log. Rather, the proposed solutions merely change the manner in which the messages are viewed by a human user. As such, the proposed solutions fails to address many of the resource costs created by large system logs.

Another proposed solution is described in Yinglung Liang, Yanyong Zhang, Hui Xiong and Ramendra Sahoo, *An Adaptive Semantic Filter for Blue Gene/L Failure Log Analysis, In Proceedings of the Third International Workshop on System Management Techniques, Processes, and Services (SMTPS),* 2007. This proposed solution filters the centralized system log of a super computer or the centralized system log of a multi-node computing system based on message redundancy by targeting and eliminating redundant log records that identify the same unit of information (e.g., the same event), but differ with reference to location (which node of a plurality of nodes sent the message) or time (the time that the message originated from a particular node).

However, the system proposed by Yinglung Liang et al. has limited log size reduction capability in contexts outside centralized logging systems. In centralized logging systems, there is a high likelihood that redundant messages will be received from the large number of different nodes. Therefore, limiting message removal to only redundant messages in such a system may yield a large log size reduction. However, in other systems, such as a system log which locally logs messages for a single node system, there is a low likelihood that the technique will find many duplicate messages. As such, Yinglung Liang et al. techniques do not yield much log size reduction because the technique is limited to only removing the few duplicative messages that may be found in a local log. For example, if the message of interest is redundant, then it is deleted; if the message of interest is not redundant, then the message is not deleted. The system's algorithm is equitable to a rudimentary if/then solution and is not designed to make nuanced filtering decisions regarding the value of one non-redundant message as compared to another non-redundant message. Thus, when the message of interest is non-redundant, the solution is unable to intelligently determine the informational value of a non-redundant message. Accordingly, the solution is unable to determine whether to delete a non-redundant message based the value of the information in the non-redundant message.

BRIEF SUMMARY OF THE INVENTION

Systems and methods disclosed herein provide filtering of system log messages having low utility value. In providing the filtering, the systems and methods determine the informational value of a system log message and delete the message from the system log if the message is determined to be of low informational value. As such, embodiments herein provide an system log filter, which reduces the amount of data stored in the system log based on the utility value of the message.

The foregoing has outlined rather broadly the features and technical advantages of exemplary embodiments in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the invention.

BRIEF DESCRIPTION OF THE DRAWINGS

For a more complete understanding of the present disclosure, reference is now made to the following descriptions taken in conjunction with the accompanying drawing, in which.

DETAILED DESCRIPTION OF THE INVENTION

Figure 1:
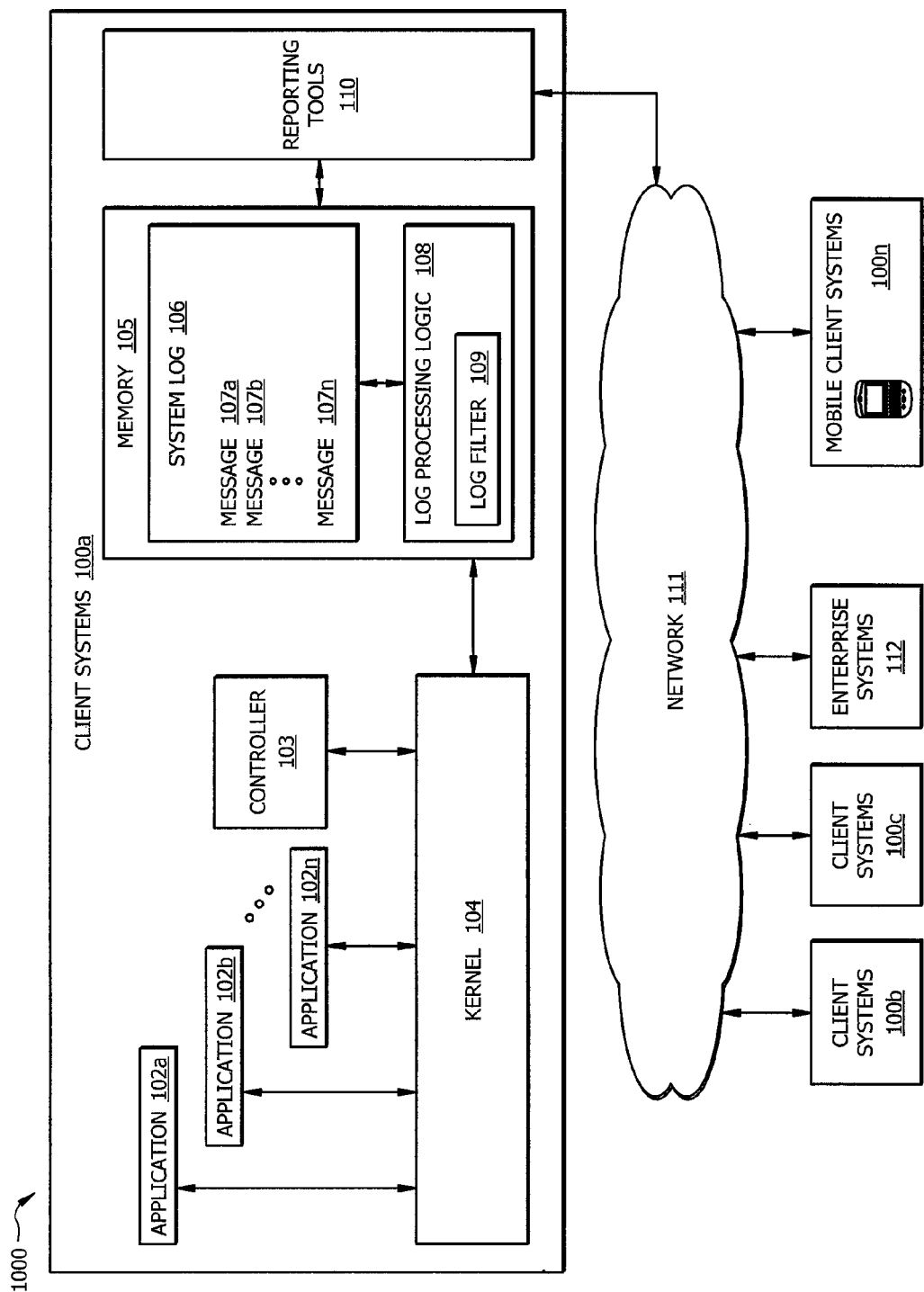
FIG. 1 is an example illustration of systems operative to provide filtering of system log messages having low utility value.

FIG. 1 illustrates an example system 1000 which provides filtering of system log messages having low utility value.

Within system 100, a customer may have one or more client systems 100a-100n, which may be one or more stationary or mobile processor-based systems, such as server systems, computer appliances, computer workstations, smart phones, tablets (e.g., an Apple iPad®), PDAs, medical devices, etc. Accordingly, client systems of embodiments may comprise a processor (e.g., central processing unit (CPU), application specific integrated circuit (ASIC), programmable gate array (PGA), etc.), memory (e.g., random access memory (RAM), read only memory (ROM), disk memory, optical memory, flash memory, etc.), and suitable input/output circuitry (e.g., network interface card (NIC), wireless network interface, display, keyboard, data bus, etc.). The foregoing processor-based systems may operate under control of an instruction set (e.g., software, firmware, applet, code, etc.) stored on a non-transitory computer-readable medium providing operation as described herein.

Client systems 100a illustrates an example kernel based computer system. Client systems 100a may include one or more applications 102a-102n which operate in communication with kernel 104 and controller 103. Client systems 100a comprise memory 105, which may comprise disk memory, flash memory, optical memory, and/or other suitable computer readable media or medium.

Memory 105 may store data and computer executable software, which is executable by one or more computer processors of client systems 100a. Memory 105 may also comprise one or more buffers comprising system log 106. Buffers of client systems 100a may be partitioned as desired and comprise one or more system logs which may be partitioned as desired. System log 106 comprises one or more messages 107a-107n, that provide information about client systems 100a. For example, messages 107a-107n may provide information regarding the status of various tasks, execution paths including function names and parameters, error conditions, system states, device changes, device drivers, system changes, events, system operations, and more.

Memory 105 may comprise log processing logic 108, which is executable by one or more computer processors located within memory 105, controller 103, kernel 104, and/or one or more other computer processors which are local or remote from memory 105. Log processing logic 108 may include computer executable software operable to process information of the system log. Further, log processing logic 108 may be modified locally and/or remotely as is desired.

Memory 105 may also include log filter 109, which may be an intelligent and unsupervised filter that reduces the amount of data stored in system log 106. Log filter 109 may be considered an intelligent filter because the reduction of information caused by log filter 109 is an active decision purposefully made by log filter 109 as opposed to an information loss caused by coincidence or mistake (e.g., data losses caused by buffer overflows, transmission errors, writing errors, etc.). Further, log filter 109 may be considered an unsupervised filter because log filter 109 is operable to make runtime decisions without the need for human confirmation at decision making time. In embodiments, log filter 109 may be an intelligent log filter with supervised learning, which is explained in more detail below. In embodiments, log filter 109 may be located remotely from memory 105 (e.g., elsewhere in client systems 100a, remotely from client systems 100a, etc.). More detail regarding operations of log filter 109 are provided below beginning with FIG. 2.

Client systems 100a may also comprise reporting tools 110 operable to transmit information using network 111. In example system 1000, network 111 may comprise various forms of communication infrastructure, such as a SAN, the Internet, the public switched telephone network (PSTN), a local area network (LAN), a metropolitan area network (MAN), a wide area network (WAN), a wireless network (e.g., a cellular communication network, a wireless LAN, etc.), and/or the like. Network 111, or a portion thereof may provide infrastructure of network connections or, alternatively, network connections may be provided by network infrastructure separate from network 111, wherein such separate network infrastructure may itself comprise a SAN, the Internet, the PSTN, a LAN, a MAN, a WAN, a wireless network, and/or the like.

Reporting tools 110 may use network 111 to send system log 106 (or portions thereof) to enterprise systems 112. Enterprise systems 112, for example NetApp® systems, may offer a number of services to customers using client systems 100a. For example, network systems 112 may offer remote customer support, for example, by periodically collecting system log 106 from client systems 100a. Enterprise systems 112 may receive system log 106 at a central enterprise repository, where system log 106 may be monitored for alerts, problem forecasting, and troubleshooting. Enterprise systems 112 may offer live customer support and/or may collect system logs from one or more client systems 100a-100n for other purposes, for example, research, product development, demographic research, information harvesting, advertisement purposes, etc.

Enterprise systems 112 may facilitate a clustered environment giving client systems 100a-100n access to one or more clustered storage server systems and one or more remote storage devices. When client systems 100a-100n send system log 106 (or portions thereof) to enterprise systems 112, system log 106 may be stored in any number of the one or more remote storage devices, as is desired. Enterprise systems 112 collect system logs from a plurality of client systems 100a-100n, wherein the client systems 100a-100n may be associated (e.g., owned, operated, etc.) with one or more different customers and/or entities. Client systems 100a-100n may be different types of computing systems. For example, client systems 100a is a kernel based system while client systems 100n is a mobile device (e.g., a smart phone or tablet). Client systems 100 may be any computing system which stores a system log.

Figure 2:
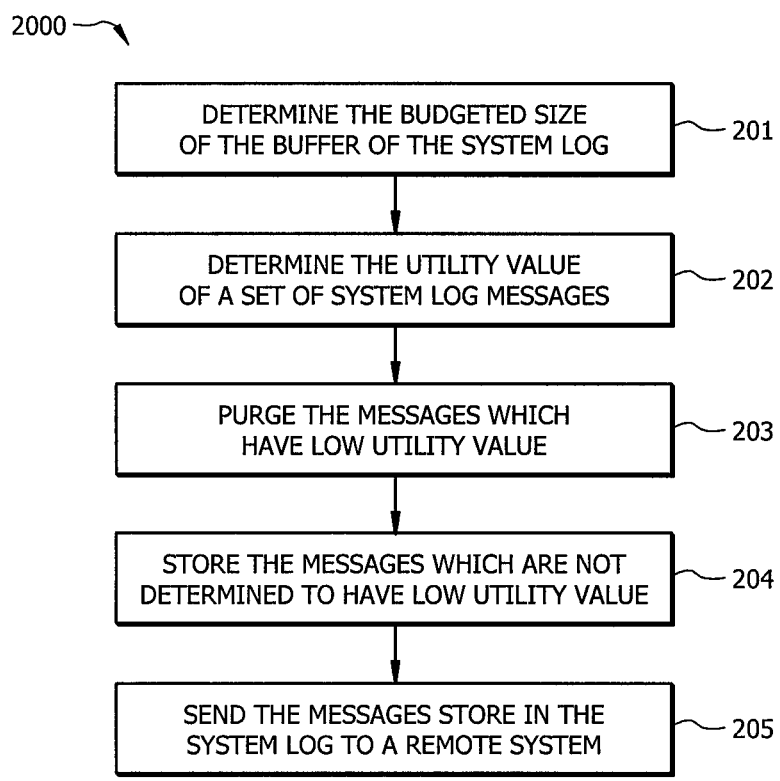
FIG. 2 shows an example of filtering data of a system log based on the messages' utility value.

FIG. 2 illustrates an example method 2000 of filtering data of system log 106, which is a local system log of client systems 100a. The steps of FIG. 2 may be performed by a processor of memory 105, controller 103, kernel 104, and/or any computer processor of client systems 100a or in communication with client systems 100a. In many systems, the buffer of system log 106 has a budgeted size and provides an upper limit on the number of messages that can be stored. In step 201, client systems 100a determines the budgeted size of the buffer of system log 106. In determining the budgeted size for the buffer, client systems 100a may use a look up table, may measure the actual size of the buffer, and/or the like. Further, client systems 100a may determine a runtime dynamic size of the buffer. In embodiment systems, the size of buffers may be dynamically increased or decreased based on the availability of system resources. As such, in step 201, client systems may measure the actual size of the buffer, at a moment in time. Further, rather than determining the overall size of the buffer, client systems may determine the amount of available buffer space at a moment in time.

In step 202, client systems 100a determine the utility value of each message of a set of messages 107a-107n of system log 106. A set of messages may be a subset of messages or all the messages of system log 106. The utility value of a message may be contingent on the amount of new information or unpredictable information contained within the message. For example, if a log user analyzing the message of interest would not be able to guess or infer the information therein from a previous message, then the message may be considered to have high utility value because it comprises new information that could not be inferred from a previous message. Conversely, if a log user analyzing the message of interest would be able to guess or infer the information therein from a previous message, then the message may be considered to have low utility value because it comprises old information that is obvious or inferable from a previous message. As such, the utility value of a message may be dependent on the context of prior information. When determining whether a message has a low utility value, log filter 109 may assign the message a utility score and compare the utility score to a threshold utility value. If the assigned utility score of the message is equal to or higher than the threshold utility value, then log filter 109 will determine that the message is of high or sufficient utility value. If the assigned utility score of the message is lower than the threshold utility value, then log filter 109 will determine that the message is of low or insufficient utility value. Further detail regarding systems and methods for determining the utility value of messages is provided below in FIG. 3.

In step 203, client systems 100a purges a message that is determined to have low utility value. If log filter 109 is filtering messages which are already stored in system log 106, then client systems 100a purge messages by deleted the messages from system log 106. If the log filter 109 is filtering messages before the messages are stored in system log 106, then client systems 100a purges messages by preventing the messages from being stored in system log 106. Log filter 109 may be operable to filter messages before the messages are stored in system log 106 as well as filter messages that are already stored in system log 106. For example, log filter 109 may filter all messages before the messages are stored in the system log; then, upon a triggering event (e.g., client system 100a determines that the buffer of system log 106 has reached a threshold level of fullness) log filter 109 may filtering all messages already stored in system log 106 using a higher threshold utility value. By reprocessing the stored messages using a high threshold value upon determining that the buffer is in danger of overflow, log filter 109 reduces the number of messages in the buffer using intelligent filtering and thereby prevents the loss of messages caused by buffer overflow message dropping.

In step 204, client systems 100a store messages that are determined to have high or sufficient utility value. Log users of client systems 100a may analyze the stored messages to provide customer support, repairs, alerting, problem forecasting, system diagnosis, and/or debugging of the system, and/or conduct product development. In embodiments, log users of client systems 100a may archive the messages as is desired.

In embodiments, client systems 100a may perform step 205, which transmits messages of system log 106 to a remote location. Step 205 may be performed by a transmitter, a processor of reporting tools 110, a processor of memory 105, controller 103, kernel 104, and/or any computer processor of client systems 100a or in communication with client systems 100a. The remote location may be enterprise systems 112. Step 205 may be operational to send all of the messages of system log 106 or a subset of messages of system log 106. Step 205 may be performed periodically. Additionally or alternatively, step 205 may be performed in response to a request from the remote location. Additionally or alternatively, step 205 may be performed in response to the buffer length of system log 106 and/or any trigger as is desired. Upon the remote location receiving messages of system log 106, the remote location may store and/or archive the messages (or a subset thereof) as is desired. In embodiments, a log filter operable as described herein may filter the messages after transmission (for example, to reduce storage and/or archive costs), and the log filter may use a higher threshold utility value as compared to the log filter of client systems 100*a*. Further, log users of the remote site may use the messages to provide customer support, repairs, alerting, problem forecasting, system diagnosis, and/or debugging of the system, and/or conduct product development.

Figure 3:
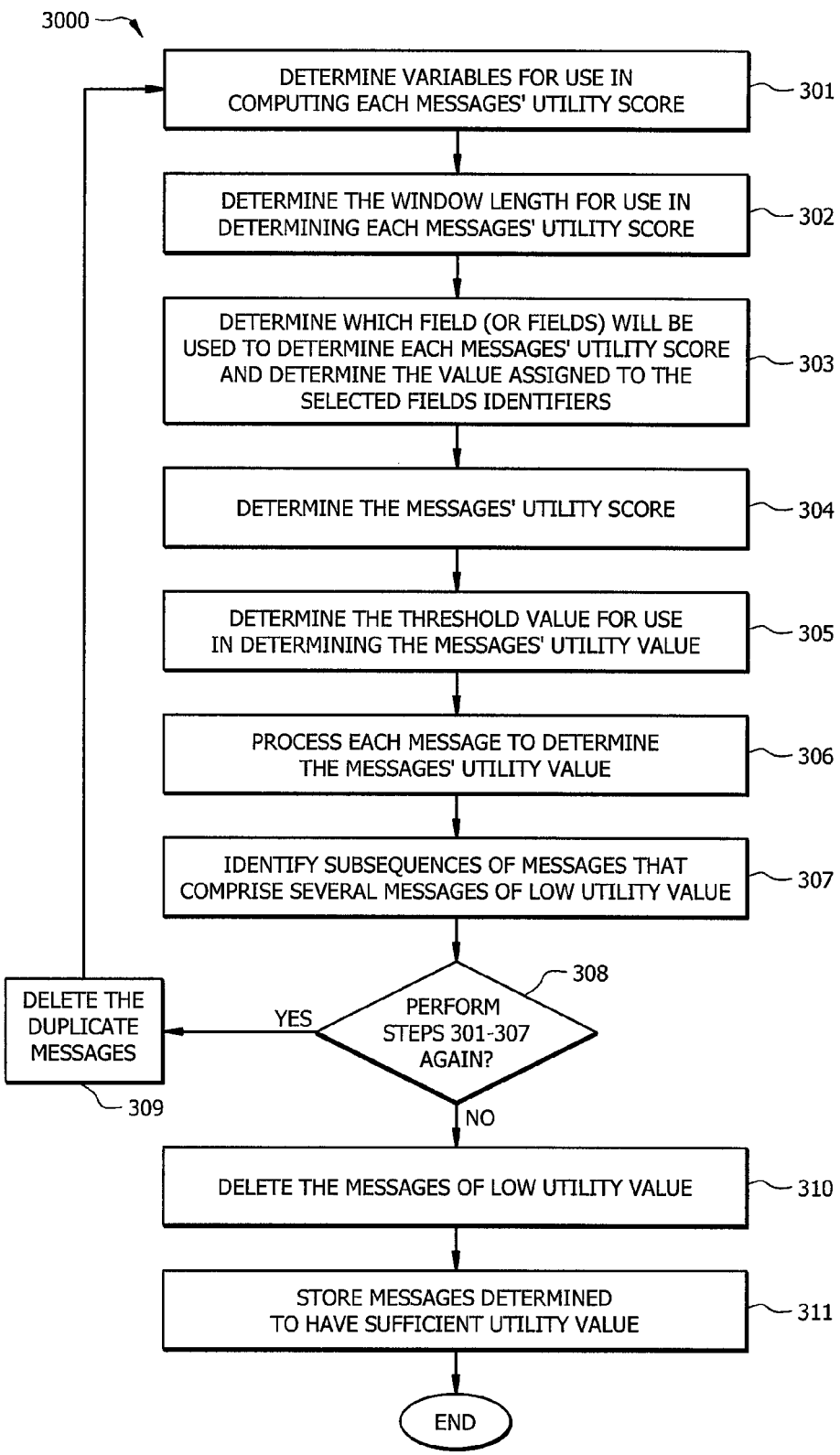
FIG. 3 is a an example of determining the utility value of a message or set of messages.

FIG. 3 is an example method 3000 for determining the utility value of a message of a set of messages of system log 106. The steps of FIG. 3 may be performed by a processor of memory 105, log filter 109, controller 103, kernel 104, and/or any computer processor of client systems 100*a* or in communication with client systems 100*a*. In this example, log filter 109 is operable to perform the steps of FIG. 3.

Before detailing the steps of FIG. 3, an explanation of message utility value may be helpful. In short, the utility of a message may be a function of the predictability of the information in the message, which may be dependent on the context of the system as determined by information from prior messages. Consider an example scenario where a disk drive of client systems 100*a* has failed and the system is in redundant array of independent disks (RAID) rebuild mode. In a convention system, the system log would first log messages comprising information about disk failure and subsequently log messages comprising information about the RAID rebuild. Typically, this condition would be accompanied by messages including information about increased central processing unit (CPU) utilization and/or low spare space in aggregates. For the log user of a conventional system, the messages gave important and new information about disk failure and an ongoing RAID rebuild. In light of the system's context, messages thereafter which provide information corresponding to increased CPU utilization and/or low spare space in aggregates are expected (e.g., predicable) and of low utility value because they contain information that was inferable from the previous messages (e.g., old information and/or predictable).

Conversely, an abnormal increase in CPU utilization during normal operations of a system are unexpected and carry high utility value to the log user. In the context of a normally operating system, a log user would find messages indicating an abnormal increase in CPU utilization highly valuable because the messages were unexpected (e.g. unpredictable) and an indicator of an anomaly or an impending breakdown of the system. As such, a message such as "increased CPU utilization" may have high utility value in some contexts but have low utility value in another context. Thus, the utility of a message may be a function of the predictability of the information in the message, which may be dependent on the context of the system as determined from prior messages.

We show in table 1 an extract from a conventional system log file with messages of low utility value emphasized via italics font.

TABLE 1

Mon Sep 19 00:42:46 UTC [asup.smtp.unreach:error]: Autosupport mail was not sent because the system cannot reach any of the mail hosts from the autosupport.mailhost option. (REBOOT (power on))
*Mon Sep 19 00:47:03 UTC [asup.smtp.host:info]: Autosupport cannot connect to host 141.146.46.30 (Network comm problem) for message: REBOOT (power on)*
Mon Sep 19 00:47:03 UTC [asup.smtp.unreach:error]: Autosupport mail was not sent because the system cannot reach any of the mail hosts from the autosupport.mailhost option. (REBOOT (power on))
*Mon Sep 19 00:51:27 UTC [asup.smtp.host:info]: Autosupport cannot connect to host 141.146.46.30 (Network comm problem) for message: REBOOT (power on)*

In this example, the system experienced a failure of a mailer. Due to the failure, the system stores in the system log the "asup.smtp.unreach:error" message, which will inform a log user of the failure of the mailer. Also, due to the failure, the system stores in this conventional system log the "asup.smtp.host:info" message, which informs a log user that the destination is not reachable. The latter message indicating that the destination is not reachable is predictable from the former message about the failure of the mailer. As such, the latter message is of low utility value because the information therein was inferable from the information in the previous message.

FIG. 3 illustrates an example method 3000 wherein client systems 100*a* perform step 202 disclosed above. As such, method 3000 determines the utility value of a set of messages 107*a*-107*n*. Method 3000 may be performed by a processor of memory 105, log filter 109, controller 103, kernel 104, and/or any computer processor of client systems 100*a* or in communication with client 100*a*. In this example, log filter 109 is operable to perform the steps of FIG. 3.

In step 301, client systems 100*a* define variables for use in determining the utility score for messages. For example, the method identifies L, a list of messages of interest. The list of messages of interest may be all messages of the system log, all messages destined for the system log, and/or a subset thereof. Further, Mi may be identified as a particular message of interest and be located at the ith place in the list of messages. W may be defined as the context of the message (Mi), which is determined by messages that precede the message of interest (Mi). With the variables defined, the prediction probability of the message of interest (Mi) may be expressed as P(Mi|W). P(Mi|W) shows that the prediction probability of the message is determined based at least on message's context, W.

A utility score may be expressed as U, and the utility score of the message of interest may be expressed as Ui. When U=1−P(Mi|W), a message's utility score is an inverse of its prediction probability in light of the message's context. As such, when a message is 100% predicable, the message has no utility value. Thus, the utility score of the message may be zero(e.g., 0% utility). Shown mathematically, when a message is 100% predicable, P(Mi|W)=1. Thus, it follows that Ui=1−1, and Ui=0. Conversely, when a message is 0% predicable, the message has high utility value because it was completely unexpected. Thus, the utility score of the message may be 1 (e.g., 100% utility). Shown mathematically, when a message is 0% predicable, P(Mi|W)=0. Thus, it follows that Ui=1−0, and Ui=1.

In step 302, the method sets the number of messages that will be used to determine the context of the message of interest (Mi). As explained above, W may be defined as the message's context, which is based on a set of messages preceding the message of interest. w is the number of messages in the set of preceding messages. In this example, w is set to 5 meaning that the context of the message of interest (Mi) is determined based on the 5 messages preceding the message of interest. Embodiments herein are not limited to w=5, and the number of preceding messages may be selected by the system (e.g., based on dynamic allocation of system resource availability), selected by a user, based on a sliding scale, and/or the like. As the log filter moves down a list of messages of the system log (e.g., processing one message of interest after another), the set of messages preceding the message of interest slides down and remains w messages ahead of the message of interest. As such, the context (e.g., the set of messages preceding the message of interest) may be a sliding window of messages that is w messages long.

Figure 4A:
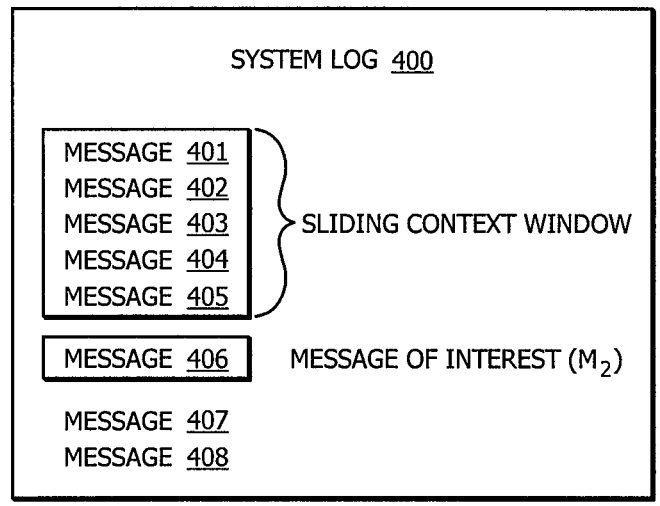
FIGS. 4A and 4B shown an example of a sliding window of messages defining a context for messages of interest.
Figure 4B:
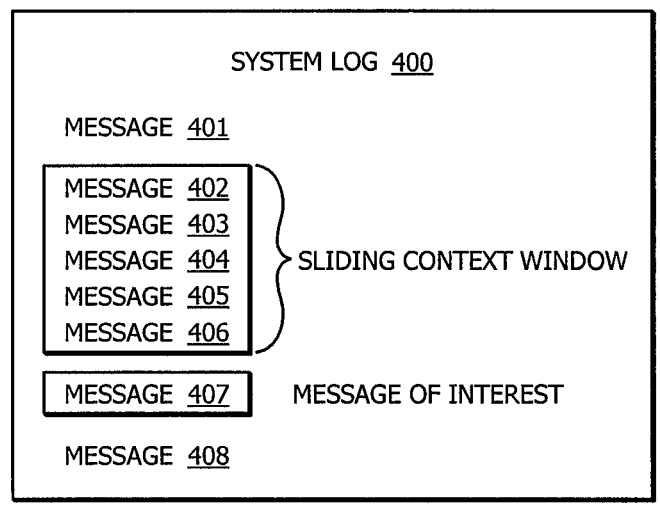

An example of the sliding window of messages is shown in FIGS. 4A and 4B. FIG. 4A shows an excerpt of system log 400 and comprises a list of messages 401-408. In this example, the log filter is determining the utility value of message 406; thus, message 406 is designated the message of interest. w is set as being the five preceding messages; as such, the sliding context window in this example includes messages 401-405. In this set up, when log filter determines the utility value of message 406, log filter will use the messages within the sliding window of messages (e.g., messages 401-405) as message 406's context (W). After log filter determines the utility value of message 406, the log filter moves down the list of messages and determines the utility value of message 407, as shown in FIG. 4B.

In FIG. 4B, message 407 is now designated as the message of interest. w is still set as being the five preceding messages; therefore, the sliding context window slides down and includes messages 402-406. At this point, when log filter determines the utility value of message 407, log filter will use the messages within the sliding window of messages (e.g., messages 402-406) as message 407's context (W). As the log filter continues to move down the list of messages to determine the utility value of the consecutive messages' of interest, the sliding window continues to slide down the list of messages. As such, the context used to determine the utility value of a message may be different for each message.

In embodiments, the log filter may limit which portion of information within a message is analyzed to determine the utility value of the message of interest. In some system logs, messages of system log have fields segmenting the information within a message, such as a date field, message type field, object identifier field, and/or the like. Table 2 below shows an example of a message with fields segmenting the information therein.

TABLE 2

| Date Field | Message Type Field | Object Identifier Field |
|---|---|---|
| Sun Aug 5 01:08:23 CDT | [diskLabelBroken] | device 2 has a broken label |

In step 303, the log filter determines which system log field (or fields) that will be used in determining a message of interest's utility value. In embodiments, the utility value may base the predictability of a message of interest based on the Message Type as compared to the Message Type of the set of messages in the sliding context window. In embodiments, the log filter may base the predictability of a message of interest on the Object Identifier as compared to the Object Identifiers of the set of messages in the sliding context window. In still other embodiments, the log filter may base the predictability of a message of interest on the device identifier and/or time stamps. Systems logs may have more or less fields and the log filter may determine a message's utility value based on any of the message's fields and/or any combination of fields of the messages. In the present example, the log filter determines that the Message Type Field will be used in determining a message of interest's utility value.

With the log field of interest selected, in step 303, the log filter determines the value assigned to the selected field's various identifiers. For example, in a system with x identifiers in the selected field, each identifier may be assigned a value, wherein the value is selected from a range of x. For instance, in embodiments with 5000 Message Type identifiers (e.g., device.labelbroken, asup.mailererror, etc.) the Message Type identifiers may be mapped to a number ranging from 1 to 5000. As such, the Message Type identifier has an assigned value s, and the log filter is operable to determine the assigned value s for each Message Type identifier. For example, the Message Type identifier for device.labelbroken may be assigned the number 234, in which case s for device.labelbroken would be equal to 234 (e.g., s=234). The among of Message Type identifiers is not limited to 5000 as the system may increase or decrease the amount of identifiers as is desired.

In step 304, the log filter uses the sliding context window and the selected field's identifiers to determine the utility score of each message of interest. In embodiments, the utility score may be determined using the following example variables and equations:

N is the number of log messages being filtered. The number of log messages may be all of the log messages of a system log or a subset thereof.

w is the length of the sliding context window. In embodiments, w may be length in terms of the number of messages. In such embodiments, if the sliding context window has 5 messages in it, w=5. In embodiments, w may be length in terms of bytes, number of characters, and or any other unit of measurement desired.

L is the number of messages in the sliding context window. As such, if the sliding window has 5 messages in it, L=5. If w is defined as length in terms of messages, then L is equal to w. In embodiments wherein w is defined as being a unit other than the number of messages, then L identifies the number of messages included within length w. For the sake of clarity, in the examples below, w is defined in terms of messages, so w is equal to L.

Cs is the number of sliding context windows in the system log that start with a message having the selected field's identifier of s.

P(s) is the absolute probability of seeing a message with the selected field identifier of s in the system log. P(s)=Cs/N is the number of windows that start with the a message having the identifier s and contain message e within the window. Message e is also referred to herein as the message of interest $M_i$.

P(e, s) is the joint probability of seeing message e in a sliding context window starting with the identifier s.

$$P(e, s) = \frac{C_s^e}{(\omega - 1) * (N - \omega + 1)}$$

P(e|s) is the conditional probability of seeing the message e in a given sliding context window that starts with the message e.

$$P(e \mid s) = \frac{P(e, s)}{P(s)}$$

Φ is the average absolute probability for all possible messages e having an identifier s seen in the log file. In embodiments where the selected field is the Message Type Field, Φ is the average value for all possible Message Type identifiers seen in the system log.

μ is the average conditional probability for all possible pairs of messages e having an identifier s seen in the log file. In embodiments where the selected field is the Message Type Field, μ is the average of the conditional probabilities of all possible pairs of Message Type identifiers seen in the system log.

P(e|W) is the prediction probability of message e conditioned on its context (W). P(e|W) is computed as a function of the message's conditional probability with regards to the messages of its sliding context window. Because message e is the message of interest Mi, this equation may also be written as P(Mi|W), as disclosed above.

The message of interest's context (W) is given by the set of w messages in the sliding context window. This may be denoted as W=$M_{i-w}$ . . . $M_{i-1}$, wherein Mi denotes the message of interest (e.g., the message at the $i^{th}$ position in the list L). As such, the prediction probability of a message of interest may be expressed as follows P(Mi|W)=P(Mi|$M_{i-w}$ . . . $M_{i-1}$).

There are several ways that client systems 100a may combine the prediction probabilities of the individual messages. Three possible combinations are shown in table 3 below.

TABLE 3

| Approach | Prediction probability (P(Mi|W)) | Threshold (θ) |
| --- | --- | --- |
| Conjunctive | $\pi_{j=i-w}^{i-1} P(M_i|M_j)$ | $\mu^w$ |
| Disjunctive | $1 - \pi_{j=i-w}^{i-1} (1 - P(M_i|M_j))$ | $\mu$ |
| Markov | $P(M_{i-w}) * \pi_{j=i-w}^{i-1} P(M_{j+1}|M_j)$ | $\Phi * \mu^w$ |

Table 3: three approaches for computing prediction probability and threshold values (threshold values are described in step 305 below)

Given the equations above, the log filter computes the utility score of each message of interest, wherein the utility score is equal to the prediction probability which may be computed using any of the three approaches of Table 3. For example, if the log filter is using the conjunctive approach, then the utility score of a message of interest will be determined to be:

$$U = \Pi_{j=i-w}^{i-1} P(M_i|M_j)$$

Of course the prediction probabilities of table 3 are mere examples, and log filter may use other approaches, as desired, to compute the utility score of each message. Once the utility scores of the messages are determined, the log filter is finished with step 304.

In step 305, which may be performed before, during, or after step 304, the log filter determines the threshold utility value that will be compared to the messages' utility score in order to determine each messages' utility value. In embodiments, if the utility score of a message of interest is equal to or higher than the determined threshold utility value, then the message of interest will be considered to have sufficient or high utility value and will not be deleted from the system log during a particular processing iteration of the system log. Conversely, if the utility score of a message of interest is lower than the determined threshold utility value, then the message of interest will be considered to have low utility value and will be deleted from system log during a particular processing iteration of the system log. When determining the threshold utility value, the threshold value may be selected based at least on which predictive probability approach the system uses in computing the messages' utility scores, as is shown by way of example in table 3 above. Further, the threshold value may be set by a log user and/or system administrator, may be defined in a look up table, and/or the like.

In step 306, the log filter processes each message of the system log to identify the messages' utility value. In embodiments, the utility score of a message may be compared with the determined threshold utility value to determine the message's utility value. As explained above, if the utility score is equal to or higher than the threshold utility value, then the message is of sufficient or high utility value. If the utility score is below the threshold utility value, then the message is of low utility value. When determining the messages' utility value, the log filter may use a multiplier λ such that the threshold is a scaled threshold (λ*θ). The multiplier may be used by the log filter to increase or decrease the sensitivity of the log filter. For example, if client systems 100a determined that the system log has a small budgeted buffer size or that the system log is approaching a overflow condition, client system 100a may adjust the multiplier to make the log filter more sensitive and causes the log filter to identify a greater number of messages as being of low utility.

Further, utility value is also sensitive to the window length, w. Large window lengths increase the dependency of the prediction probabilities on many messages, which reach further into the past. Conversely, short window lengths limit the dependence probability computations to a smaller amount of more recent messages. As such, client systems 100a may additionally or alternatively adjust the sliding context window lengths in order to adjust the sensitivity of the log filter.

In step 307, the log filter identifies subsequences of messages which comprise several of messages of low utility value. To qualify as a subsequence which comprises several messages of low utility, the subsequence of messages may comprise equal to or more than a threshold number of low utility messages (e.g., more than 30%, 40%, 50%, 60%, 70%, 80%, 90%, and/or 100%). The percentage (and/or number) of messages may be any number and may be set by a user, determined from a look up table, and/or determine by the log filter based on runtime conditions of the client systems 100a. Subsequences which comprise several messages of low utility may be referred to herein as low utility subsequences.

After the first processing iteration (e.g., first performance of steps 301-307) is complete, in step 308 the log filter determines whether steps 301-307 should be repeated (e.g., whether the log filter should perform another iteration) on the messages. In embodiments, the determination of 308 is contingent on whether the log filter identifies any low utility subsequence as having duplicative messages therein. If any low utility subsequences comprise duplicative messages, the log filter deletes the duplicative messages in step 309 and repeats steps 301-308 on the messages which have not yet been deleted. Steps 301-308 may be repeated until step 308 determines that steps 301-307 need not be repeated again. In embodiments, step 308 determines that an iteration need not be repeated again upon determining that no low utility subsequences comprise duplicative messages.

If at step 308, the log filter does not identify any low utility subsequence as having duplicative messages therein, then the log filter may move to step 310. In step 310, the log filter deletes any remaining messages having low utility value. As such, in step 310, the log filter deletes non-redundant messages which are determined to be a low utility value. In step 311, the log filter stores (or continues to store) messages determined to have sufficient or high utility value and the processing ends until the process is triggered to begin again.

As explained above, any number of events may trigger the process illustrated in FIG. 3 to begin (or begin again). For example, process 3000 may begin periodically and/or upon request. Process 3000 may be triggered to begin based on system conditions, for example, in preparation to transmit a system log to a remote location, in response to a decrease in system activity (thereby freeing up processing resources), in response to an increase in system activity (in anticipation of an increase in system log messages), in response to an indication that the system log is in danger of overflowing, and/or the like. Once the system log is processed, for example according to methods 2000 and 3000, the system log comprises less data due to the intelligent unsupervised log filtering of low utility value messages thereby reducing costs of system log collection, monitoring, transmission, storage, and archival.

Methods 2000 and 3000 have been described as filtering a system log using an intelligent unsupervised log filter. In embodiments, log filter 109 may be an intelligent unsupervised log filter with supervised learning capabilities. An intelligent unsupervised log filter with supervised learning capabilities is an intelligent unsupervised log filter which incorporates user feedback into its decision making capabilities. In embodiments, log filter 109 may incorporate user feedback by modifying the original conditional probabilities to incorporate prior bias.

An example of incorporating prior bias is shown in the following formulas:

As explained above, P(e|s) may be the original conditional probability of seeing the message e in a given sliding window starting with the message e.

$$P(e \mid s) = \frac{P(e, s)}{P(s)}.$$

The original conditional probability, P(e|s), may be modified to incorporate prior bias, which may be expressed by $\alpha^{[S,E]}$. As such, the modified conditional probability may be expressed as $$P(e \mid s, \alpha^{[S,E]}) = \frac{P(e \mid s) + \alpha^{[S,E]}}{1 + \alpha^{[S,E]}}.$$

The prior bias may be defined by user input and stored in memory such that log filter 109 may use the prior bias when making runtime decisions.

Note that while e and s denote individual messages, E and S represent the module names to which these messages belong to. For example, nis.lclGrp.updateSuccess:info is a message and nis.lclGrp is the module name. In embodiments, the bias factors may be defined for each module pair, shown by the superscript [S,E], to limit their number. By limiting the number of module pairs, a fewer number of tuneable parameters are involved which make the optimization process less costly.

Alternatively, the bias factors may not be defined for some module pairs as opposed to each and every module pair. This may lead to a larger number of tuneable parameters and render the process of optimization more expensive in comparison. However, such filtering may yield results that are more finely tuned.

Although the exemplary embodiment and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A computer-implemented method comprising:
   determining, by a log filter, a utility value of each message of a plurality of messages of a system log, the utility value of a respective message based on predictability of information in the respective message, the predictability of information based on a set of one or more messages preceding the respective message in the systemlog;
   purging each respective message of the plurality of messages which are determined to have a utility values that is lower than a threshold utility value;
   wherein before purging messages determined to have a low utility value:
   identifying duplicative messages within one or more respective subsequence of the plurality of messages;
   deleting, within each respective subsequence of the plurality of messages, all but one of the duplicative messages;
   after deleting all but one of the duplicative messages within each respective subsequence of the plurality of messages:
   computing a utility score for each remaining message of the system log,
   comparing the utility score of each remaining message to the threshold utility value, wherein each message having a utility score lower than the threshold utility value is determined to have a low utility value, identifying subsequences of the remaining messages, wherein the subsequences of the remaining messages comprise a threshold number of messages of low utility value, and determining, for each of said subsequences of the remaining messages, that no duplicative messages exist within the respective subsequences of the remaining messages; and storing, in a memory, each respective message of the plurality of messages which are determined to have a utility value that is equal to or higher than the threshold utility value.

2. The method of claim 1 wherein the log filter determines that the utility value of the respective message is lower than the threshold utility value at least when the log filter is able to predict information of the respective message from the set of one or more messages preceding the respective message in the system log.

3. The method of claim 1 wherein the set of one or more messages preceding the respective message in the system log is a determined number of messages that immediately precede the respective message in the system log.

4. The method of claim 3 wherein the determined number of messages is dynamically determined based at least on an availability of one or more system resources.

5. The method of claim 1 further comprising:
determining the system log's buffer size.

6. The method of claim 5 wherein the threshold utility value is dynamically set based at least on the determined size of the buffer of the system log.

7. The method of claim 1 wherein the threshold utility value is dynamically set based at least on an availability of one or more system resources.

8. The method of claim 1 further comprising:
sending the stored messages to a remote system.

9. A system comprising:
a processor;
a log filter for execution by the processor, the log filter operable to:
determine a utility value of each message of a plurality of messages logged in a system log, the utility value of a respective message based on predictability of information in the respective message, the predictability of information based on a set of one or more messages preceding the respective message in the system log;
purge each respective message of the plurality of messages which are determined to have a utility value that is lower than a threshold utility value,
wherein before messages determined to have a low utility value are purged:
identify duplicative messages within one or more respective subsequence of the plurality of messages;
delete, within each respective subsequence of the plurality of messages, all but one of the duplicative messages;
after deleting all but one of the duplicative messages within each respective subsequence of the plurality of messages:
compute a utility score for each remaining message of the system log,
compare the utility score of each remaining message to the threshold utility value, wherein each message having a utility score lower than the threshold utility value is determined to have a low utility value,
identify subsequences of the remaining messages, wherein the subsequences of the remaining messages comprise a threshold number of messages of low utility value, and determine, for each of said subsequences of the remaining messages, that no duplicative messages exist within the respective subsequences of the remaining messages; and store each respective message of the plurality of messages which are determined to have a utility value that is equal to or higher than the threshold utility value.

10. The system of claim 9 wherein the log filter is further operable to determine that the utility value of a respective message is lower than the threshold utility value at least when the log filter is able to predict information of the respective message from the set of one or more messages preceding the respective message in the system log.

11. The system of claim 9 wherein the set of one or more messages preceding the respective message in the system log is a determined number of messages that immediately precede the respective message in the system log.

12. The system of claim 11 wherein the determined number of messages is dynamically determined based at least on an availability of one or more system resources.

13. The system of claim 9 wherein the log filter is further operable to:
determine the system log's buffer size.

14. The system of claim 13 wherein the threshold utility value is dynamically set based at least on the determined buffer size of the system log.

15. The system of claim 9 wherein the threshold utility value is dynamically set based at least on an availability of one or more system resources.

16. The system of claim 9 further comprising:
a transmitter operable to send the stored messages to a remote system.

17. A computer-implemented method comprising:
computing, by a log filter, a utility score for each message of a plurality of messages of a system log, the utility score of a respective message based on predictability of information in the respective message, the predictability of information based on a set of one or more messages preceding the respective message in the system log;
comparing the utility score of each message to a threshold utility value, wherein each message having a utility score lower than the threshold utility value is determined to have a low utility value; and
deleting, from a memory, all messages determined to have a low utility value,
wherein before deleting all messages determined to have a low utility value:
identifying duplicative messages within one or more respective subsequence of the plurality of messages;
deleting, within each respective subsequence of the plurality of messages, all but one of the duplicative messages;
after deleting all but one of the duplicative messages within each respective subsequence of the plurality of messages:
computing a utility score for each remaining message of the system log,
comparing the utility score of each remaining message to the threshold utility value, wherein each message having a utility score lower than the threshold utility value is determined to have a low utility value, identifying subsequences of the remaining messages, wherein the subsequences of the remaining messages comprise a threshold number of messages of low utility value, and determining, for each of said subsequences of the remaining messages, that no duplicative messages exist within the respective subsequences of the remaining messages.

18. The method of claim 17 further comprising:
before deleting all messages determined to have a low utility value:
identifying subsequences of the plurality of messages, wherein the subsequences comprise a threshold number of messages of low utility value;
determining, for each said subsequence of the plurality of messages, that no duplicative messages exist within the respective subsequence of the plurality of messages.

19. The method of claim 17 wherein the threshold utility score is dynamically determined based at least on an availability of one or more system resources.

\* \* \* \* \*